Patented Feb. 24, 1948

2,436,457

UNITED STATES PATENT OFFICE 2,436,457

SULFURIZED OIL-AROMATIC OIL COMPOSITIONS

Frank J. Soday, Baton Rouge, La., assignor to The United Gas Improvement Company, a corporation of Pennsylvania No Drawing. Application February 19, 1944, Serial No. 523,117

8 Claims. (Cl. 106—249)

This invention is concerned with the use of certain high boiling aromatic oils in sulfurized oil compositions.

More particularly, this invention relates to compositions comprising one or more sulfurized oils and the high-boiling aromatic oils separated from tar formed during the production of combustible gas by processes involving the pyrolytic decomposition of petroleum oil with or without the aid of catalysts.

A feature of the invention is the provision of compositions comprising one or more sulfurized oils in combination with an oil of the type described. Another feature of the invention is the incorporation of such compositions in natural and/or synthetic rubber compounds. Other objects and advantages of the invention will be apparent to those skilled in the art upon an inspection of the specification and claims.

The vulcanization, or addition of sulfur or sulfur-containing agents such as sulfur chloride, to fatty oils, particularly unsaturated fatty oils, results in the production of sulfurized oils ranging in properties from viscous liquid compositions to solid rubber-like bodies. In case sulfur halides, such as sulfur chloride, are employed as vulcanizing agents, the products obtained will contain both sulfur and chlorine.

The oils which may be used in the preparation of sulfurized oils of the type herein described comprise all of the unsaturated, or drying, fatty oils, certain semi-drying oils, and a limited number of non-drying oils. Examples of oils which have been found to be particularly desirable for the production of such sulfurized oils are linseed, tung, oiticica, perilla, soya bean, cottonseed, rapeseed, olive, castor, poppyseed, walnut seed, corn, sandal seed, cod liver, and fish oils, as well as modifications of such oils, such as acetylated castor oil, blown linseed oil, bodied tung oil, and the like.

Although unmodified oils such as linseed oil or soya bean oil, may be sulfurized to give products possessing desirable properties, the use of oils which have been bodied or polymerized, such as by the application of heat and/or catalysts is indicated in certain cases.

In general, unsaturated vegetable oils, such as linseed, soya bean, and cottonseed oils, are preferred for the preparation of sulfurized oils of the type more particularly described herein.

The vulcanizing agent employed may comprise sulfur or sulfur derivatives, such as sulfur chloride, thionyl chloride, sulfur dichloride, sulfur dioxide, and the like.

In general, the type of product obtained from a given oil depends both upon the type of sulfurizing agent employed and upon the proportion of sulfur or sulfur derivative incorporated in the finished product. Two general types of products have found acceptance in the industry, namely, viscous liquid sulfurized oils and solid, rubber-like bodies. The liquid sulfurized oils generally contain a smaller proportion of combined sulfur than the solid, rubber-like products.

The liquid sulfurized oils are extensively used in the coating industry for the preparation of paints and varnishes, either alone or in combination with one or more drying oils, such as linseed or tung oils. Such compositions also may contain thinners, such as aromatic or petroleum solvents, and may contain other ingredients, such as pigments, driers, antioxidants, and the like.

The solid, rubber-like sulfurized oils, commonly referred to as factice, are extensively employed in the rubber industry as softening agents. Thus, the incorporation of factice in rubber compositions greatly assists in the milling, calendering, and/or extrusion of such compositions.

The most important types of factice employed as softening agents in natural and/or synthetic rubber compositions are white factice and brown factice.

White factice, which may range in color from water-white to yellow, commonly is prepared by the action of sulfur monochloride on the desired oil. The reaction is exothermic in nature and must be controlled within fairly narrow temperature limits to prevent charring. In the preparation of white factice, from 15 to 50 parts of sulfur monochloride may be combined with 100 parts of the desired oil. Thus, a satisfactory product is obtained by the reaction of 30 parts of sulfur chloride with 100 parts of linseed oil.

Brown factice may be prepared by the action of sulfur on the desired oil, or mixture of oils. The reaction is somewhat slower than when sulfur chloride is employed, and the mixture commonly must be heated before the desired reaction occurs. From 15 to 50 parts of sulfur may be combined with 100 parts of oil to prepare brown factice, the actual proportions employed in a given case depending largely upon the type of oil employed and the properties desired in the finished product. Brown factice may range in color from light brown to black.

The reaction between sulfur or sulfur derivatives and one or more drying or semi-drying oils, or derivatives thereof, may be carried out in any desired manner, although the reaction between sulfur and the desired oil or oils generally is carried out in the absence of solvents. The reaction between one or more oils and sulfur derivatives, such as sulfur monochloride, may be carried out in the presence of solvents, if desired.

In addition to its use in rubber compositions, factice also may be employed in the preparation of linoleum, mastic, and other floor coverings, as well as in molding compositions, such as those of the phenol-formaldehyde type.

The use of sulfurized oils in the industry, and particularly the use of factice in rubber compositions, has been retarded largely by certain inherent deficiencies in such materials, prominent among which may be mentioned their lack of tack and adhesion.

I have discovered that the field of utilization of sulfurized oils, and particularly factice, can be very largely increased, and their physical and mechanical properties largely improved, by the incorporation therein, either alone or in combination with other agents, of the high-boiling aromatic oils separated from tar formed during the production of combustible gas by processes involving the pyrolytic decomposition of petroleum oil with or without the aid of catalysts.

The improvement in the properties of sulfurized oils by the use of aromatic oils of the type described herein is directly traceable to certain outstanding physical properties possessed by these oils.

As these oils are substantially completely hydrocarbon in nature, and are substantially free from polar groups, sulfurized oil compositions prepared by their use are unusually stable and inert in nature, and are highly resistant to decomposition and deterioration in any way. In addition, these oils are derived from a distilled or extracted raw material, consequently they are free from dirt and other foreign material.

High-boiling aromatic oils of the type described herein also are more completely compatible with sulfurized oils than many of the solvents, plasticizing agents, and tackifying agents used heretofore for this purpose, consequently a wider range of formulations may be employed.

Probably the outstanding characteristics of these oils is their wetting and dispersing properties. This is of considerable value in the preparation of sulfurized oil compositions, as it results in a very considerable saving in the time and mechanical energy required to prepare such compositions.

In the case of rubber compositions, the remarkable solvent powers of oils of the type described result in a very considerable saving in the time required to blend the factice-oil composition with the rubber, and produces an exceptionally smooth, uniform blend. The wetting and lubricating properties of the oils of the type described, greatly improve the tubing and/or other mechanical properties of the blend obtained.

The method of preparing these high-boiling aromatic oils will be discussed in some detail in order to emphasize certain of their desirable properties.

I have discovered that the aromatic oils boiling substantially completely above 210° C. and separated from the tar formed during the production of gas by processes involving the pyrolytic decomposition of petroleum oil, with or without the aid of catalysts, is unusually well adapted for use in sulfurized oil compositions, producing products of exceptionally good properties.

In particular, the incorporation of such oils in sulfurized oil compositions, and particularly in factice, results in very largely improving the tack, adhesion, and mechanical properties of such materials. This is of very considerable practical importance from the standpoint of the utilization of such materials, and particularly the utilization of such compositions in certain synthetic rubber formulations, which are particularly deficient in tack and adhesive properties.

High-boiling aromatic oils having a preponderant portion boiling above approximately 250° C., and more particularly above 275° C., are preferred. Excellent results are obtained in most cases by the use of such oils having a preponderant portion boiling above 300° C. and more particularly above 325° C. For certain purposes, it may be preferred to employ high boiling aromatic oils of this type which boil substantially within certain ranges, for example, between 225 and 450° C., between 250° and 450° C., between 275° and 450° C., between 300° and 450° C., or between 325° and 450° C., increasing in order of preference.

Such aromatic oils have exceptional stability characteristics. This is particularly true when such oils are refined by processes to be more particularly described herein.

In addition, the excellent compatibility of aromatic oils of the type described, in conjunction with their exceptionally low viscosity characteristics, greatly assists in the blending operations required.

Aromatic oils of the type described herein are extracted and/or distilled products, consequently they contain very little, if any, free carbon or other extraneous materials.

It has been discovered that very considerable quantities of high-boiling aromatic oils of the type described are contained in the tar produced in the vapor phase pyrolysis of crude petroleum oil or a fraction or fractions thereof such as, for example, gas oil or residuum oil. This is particularly so in the case of petroleum oil gas tar produced when the pyrolysis is conducted at relatively high temperatures, such for example as in the manufacture of oil gas or carburetted water gas at average set temperatures above 1300° F. and also particularly so when the oil pyrolyzed is naphthenic, such as a crude oil classifiable in classes 5 to 7 inclusive, according to the method of classification described in Bureau of Mines Bulletin 291 as modified by Bureau of Mines Report of Investigations 3279, or a fraction or fractions of such an oil.

Recently, methods have been developed for the recovery of unusually large quantities of aromatic hydrocarbon material boiling in the ranges set forth, from petroleum oil gas tar, produced in the manufacture of gas, such for example, as carburetted water gas, oil gas, and the like. These methods recover high-boiling aromatic oils which are unique in character.

The usual distillation procedures employed for the purpose of petroleum tar dehydration and/or tar fractionation have been such as to polymerize the readily heat polymerizable monomers above 210° C., which are frequently present in large proportions, into heavy polymers, which become inextricably mixed with the heavy black pitch constituents and the high-boiling non-heat polymerizable aromatic oils present. As a result, the high-boiling aromatic oils were retained by the residual tar or pitch.

In co-pending application Serial Number 370,-

608, filed December 18, 1940, by Edwin L. Hall and Howard R. Batchelder, which has matured into Patent 2,386,259, granted October 23, 1945, high-boiling aromatic hydrocarbon oils containing heat polymerizable monomeric aromatic hydrocarbons boiling above 210° C. and separated from the heavy black pitch constituents of the petroleum tar are described and claimed, together with heat polymers produced from said polymerizable oils.

In co-pending application 336,232, filed April 1, 1941, by Waldo C. Ault, which has matured into Patent No. 2,387,237, granted October 23, 1945, there is described and claimed the production of catalytic resins from the heat polymerizable and/or catalytically polymerizable monomeric hydrocarbons boiling above 210° C. and separated in monomeric form from the heavy black pitch constituents of the petroleum tar.

The high-boiling non-heat polymerizable aromatic oils of the type described may be isolated from the unpolymerized oils obtained from each of these processes.

In the manufacture of oil gas and carburetted water gas, the tar produced is usually in the form of an emulsion due to the condensation of hydrocarbon constituents from the gas in the presence of water simultaneously condensed from the gas or otherwise present.

In copending application 342,735, filed June 27, 1940, by Edwin L. Hall and Howard R. Batchelder, which has matured into Patent 2,366,899, granted January 9, 1945, there is described a method of dehydrating such petroleum tar emulsions and of fractionating the hydrocarbon constituents thereof by rapid distillation with the separation from the heavy pitch constituents of residual tar of a mixture of non-heat polymerizable aromatic hydrocarbons and heat polymerizable unsaturated monomeric aromatic hydrocarbons boiling above 210° C.

In copending application 353,034, filed August 17, 1940, by Howard R. Batchelder, which has matured into Patent 2,383,362, granted August 21, 1945, there is described the dehydration of such petroleum tar emulsions and the fractionation of the hydrocarbon constituents thereof, with the recovery of monomeric unsaturated heat polymerizable hydrocarbon constituents and high-boiling non-heat polymerizable aromatic oils separate from the heavy black pitch constituents of residual tar, by the solvent extraction of the emulsion with a hydrocarbon solvent such as liquefied propane or butane.

Other processes, for example, fractional condensation, might be employed to recover these high boiling aromatic hydrocarbons separate from the heavy black pitch constituents of the tar. Also processes for oil pyrolysis which avoid the formation of emulsions, may be employed for the production of the high-boiling aromatic hydrocarbons. Furthermore, while it may be preferred to employ petroleum oils or cuts therefrom, which are classifiable in classes 5 to 7 inclusive according to Bureau of Mines Bulletin 291 modified as indicated above, and particularly in class 7, other oils may be employed.

As a result of separation of the light oil and higher-boiling aromatic oil components of the products of such petroleum oil pyrolysis from the residual tar, without polymerization or with materially reduced polymerization, a substantially pitch-free highly aromatic hydrocarbon material may be separated having a portion boiling within the range of from 210 to 400° C., or higher, which may contain from 5% to 30%, and higher, of monomeric unsaturated aromatic hydrocarbons readily polymerizable by heat.

As previously stated, the above mentioned heat polymerizable highly aromatic monomeric material may be readily polymerized by heat to form resins, after which the high-boiling aromatic hydrocarbons may be separated from such resins by any desired method, such as by distillation, which may be assisted by steam and carried out under reduced pressures.

Polymerization may be effected by heating the total material separated from the residual tar sufficiently to polymerize the readily heat polymerizable monomers boiling within the range of from 210° to 450° C., but insufficiently to appreciably polymerize the heat polymerizable material contained in lower boiling ranges, such, for instance, as methyl styrenes and styrene. This may be accomplished, for example, by heating with stirring for 4 hours at 200° C., followed by distillation under vacuum to isolate the resin. The higher-boiling non-heat polymerizable aromatic oils then may be separated by fractional distillation.

It may be preferable, however, to first effect a separation by fractional distillation between light oil boiling below say 210° C. and oils boiling above say, 210° C.

The polymerization of the heat polymerizable unsaturated monomeric material in the separated aromatic oils boiling above, say, 210° C. may be effected by heating the oil with stirring, for example, for four hours at 200° C.

The resin thus produced, together with any resin produced during the separation of the light oil from the higher-boiling oil, may then be removed by distillation under vacuum.

As hereinbefore stated, after polymerization the high-boiling non-heat polymerizable aromatic oils may be isolated from the resin by distillation in vacuum, which may be assisted by steam, or otherwise.

The high-boiling monomeric material derived from tar obtained in the pyrolysis of petroleum, by rapid distillation or solvent extraction methods, or otherwise, also may be polymerized prior to the separation of the desired high-boiling non-heat polymerizable aromatic oils by the application of certain catalysts, either with or without the simultaneous, or otherwise, application of heat, for example, as described and claimed in the above copending application Serial Number 336,232, filed April 1, 1941, by Waldo C. Ault.

Catalysts such as mineral acids, for example, sulfuric acid, hydrogen chloride, acids of phosphorus, or acid-acting metallic halides or complexes of said halides, preferably organic solvent complexes, as for example, boron trifluoride, aluminum chloride, boron trifluoride-diethyl ether complex, boron trifluoride-dimethyl ether complex, boron trifluoride phenyl ether complex, boron trifluoride-phenyl methyl ether complex, boron trifluoride-dioxan complex, boron trifluoride-toluene complex, corresponding aluminum chloride complexes, and the like, may be employed for this purpose.

The metallic halides and their complexes employed are characterized by their ability to hydrolyze in the presence of water to give an acid reaction and hence, for convenience they may be termed acid-acting metallic halides.

While high-boiling oils of the type described may be isolated from the tar emulsion by either distillation or solvent extraction methods, as pointed out previously, I prefer to employ high-boiling oils which have been isolated by solvent extraction methods because of the presence therein of very much larger proportions of high-boiling aromatic oils of the type desired. The flash-distillation method isolating such oils from the tar emulsion permits the polymerization of a considerable portion of the unsaturated materials to take place, (though very greatly less than in conventional methods) thus increasing the quantity of resinous and/or pitch-like materials left behind in the tar. The presence of these polymers in the tar reduces the quantity of the aromatic oils recovered, and particularly those having the desired high boiling ranges.

While aromatic oils boiling above 210° C. may be produced by conventional methods of distillation of the products of vapor phase oil pyrolysis produced in the manufacture of gas, and may be employed in accordance with the present invention, such aromatic oils are by no means as preferred for this purpose, as are the high boiling aromatic oils produced by the use of separation methods which minimize polymerization of the high-boiling heat polymerizable unsaturates.

In conventional distillation methods, the tars are subjected to elevated temperatures for such lengths of time as to polymerize the far greater part, if not all, of the high-boiling heat polymerizable unsaturates. This results in the production of a very highly viscous mass, from which the removal of the higher boiling non-heat polymerizable aromatic constituents by commercially feasible methods is precluded by very great operating difficulties.

The processes which minimize or avoid polymerization in the separation of the high-boiling aromatic oil from the tar thus produce high-boiling aromatic oils which differ from those produced by conventional processes not only in their content of high-boiling heat-polymerizable unsaturates, but also in their content of the higher boiling non-heat polymerizable aromatic constituents.

High boiling aromatic oils produced by these methods are therefore unique.

In connection with the isolation of these high-boiling aromatic oils by the preferred method, namely, by the solvent extraction of the tar emulsion, it should be emphasized that the mixture of aromatic oils and unsaturated oils obtained by such methods may be fractionally distilled prior to, during, or after polymerization to isolate the aromatic oils having the desired high boiling range. Separation by distillation prior to polymerization may be preferred in certain cases for reasons more particularly set forth in said copending applications.

Thus, the extracted oils may be distilled prior to polymerization to give a fraction boiling above, say, 275–300° C., and a lower boiling fraction. These may be polymerized separately, after which the high-boiling aromatic oils of the type desired may be isolated from the resinous materials obtained.

The process may be further illustrated by the following examples.

Example 1

Petroleum oil gas tar emulsion obtained by the pyrolysis of a Bureau of Mines type 7 naphthenic oil in the presence of steam in a ceramic chamber at temperatures above 1300° F. is extracted with liquid propane. After removal of the propane, the extracted oil is flash-distilled to give a fraction boiling almost entirely above 275° C.

This fraction is polymerized by heating to a temperature of 200° C. for a period of 4 hours after which the aromatic oils are isolated by distillation until a vapor temperature of approximately 200° C., or higher, is reached at a pressure of 20 mm. of mercury absolute.

Example 2

A sample of extracted and distilled oil similar to that employed in Example 1 is polymerized by the addition of 96% sulfuric acid in small portions at temperatures below 50° C. until no further temperature rise is noted. The addition of 1% by weight of acid usually is sufficient to insure complete polymerization.

The acid sludge layer then is removed, either with or without the addition of naphtha to reduce the viscosity of the mixture, and the polymerized material washed and neutralized. The high-boiling aromatic oils then are isolated by distillation under reduced pressure.

Example 3

A sample of extracted and distilled oil similar to that employed in Example 1 is polymerized by the addition of 3% by weight of aluminum chloride-diethyl ether complex at temperatures below 50° C. After the polymerization has been completed, the catalyst is neutralized by the addition of an aqueous alkaline solution. Clay or other desired filter aid then is added and the mass filtered. The filtered material is distilled under reduced pressures to isolate the high-boiling aromatic oils.

Any combination of the foregoing methods may, of course, be employed to isolate the high-boiling aromatic oils.

Certain fractions of such oils contain substantial proportions of relatively high-melting hydrocarbons, such as naphthalene, anthracene, and phenanthrene. While the presence of these materials is not disadvantageous from the standpoint of many electrical insulating uses, and is quite advantageous in certain cases, they may be removed, at least in part, if desired, by cooling to any desired temperature, followed by filtration to remove the crystalline material.

The oils obtained may be employed for certain electrical insulating purposes without further treatment, if desired. However, I prefer to employ oils which have been further refined to more completely remove any unsaturated and/or reactive constituents present.

As a result of extensive experimentation, I have discovered that such aromatic oils may be refined in a satisfactory manner by the application of mineral acids, such as sulfuric acid, preferably of at least 94% concentration. While any desired proportion of acid may be employed, and the refining operations carried out in any desired manner, I generally prefer to agitate or otherwise intimately contact the said oil with one or more portions of sulfuric acid. The proportion of acid employed in each washing operation preferably is from 1 to 10%, and more preferably from 2 to 5%, by volume of the oil being treated. The acid washing operations preferably are conducted at temperatures below 40° C., and more preferably below 30° C.

Excellent results are obtained when aromatic oils of the type described herein are treated with from 3 to 30% by volume of from 95 to 100% sulfuric acid, the said treatment being carried out in one or more stages, at temperatures below 35° C. When the said acid treatment is carried out in more than one stage, the sludge formed in the previous acid treatment may be removed prior to the addition of fresh acid, if desired.

After removing the acid sludge from acid washed aromatic oils of the type described herein, the said oils preferably are treated to remove any acid residues and/or sludge present. This may be accomplished, among other ways, by agitation with one or more portions of an aqueous alkaline solution, such as a 5-20% sodium carbonate solution, followed by washing with one or more portions of water. If desired, the acid-washed oil may be washed with water alone to remove any acidic residues and/or sludge, or such water washing may precede the alkaline washing described.

The acid-washed oil may be diluted with a lower-boiling oil of lower specific gravity, such as an oil boiling below 175° C., for example xylene, prior to alkali and/or water washing in order to permit the sludge present to settle in a more satisfactory manner. After the neutralizing operations have been completed, the lower-boiling oil or oils, may be separated from my refined high-boiling aromatic oil by distillation and/or fractionating operations.

The acid-washed aromatic oils also may be neutralized by contacting with an adsorbent agent, such as silica gel, alumina, clay, diatomaceous earth, infusorial earth, and the like, for example attapulgus clay, and such neutralizing operations may be carried out in a batch or continuous system and at room temperatures or elevated temperatures. Such treatment with absorbent agents may be carried out alone or in conjunction with aqueous alkaline washing and/or water washing operations, if desired. When carried out in conjunction with alkaline and/or water washing operations, the treatment with absorbents preferably is carried out last in order to remove all traces of impurities from the said refined oils.

In the absence of such treatment with an absorbent agent, the acid-refined and neutralized oil may be distilled, if desired, to remove all traces of any non-volatile impurities present.

In certain cases, aromatic oils of the type described herein may be refined in a satisfactory manner by treatment with absorbent agents without resource to other refining operations. In general, however, I prefer to acid-wash such oils in order to more completely remove any unsaturated and/or reactive compounds present.

As pointed out previously, I have discovered that aromatic oils of the type described herein should preferably have the preponderant part boil above at least 250° C., and more particularly 275° C. Excellent results are obtained when aromatic oils of the type described, the preponderant part of which boil above 300° C., and more particularly above 325° C., are employed. These oils comprise mixtures of a large number of aromatic hydrocarbons.

In addition, such oils are preferred which have mixed aniline points below 15° C., and more particularly below 10° C., for example, between 10° C. and 4° C., and lower. A mixed aniline point of a given oil is defined as the critical solution temperature of a mixture of 10 cc. of anhydrous aniline, 5 cc. of the oil being tested, and 5 cc. of a petroleum naphtha having an aniline point of 60° C., as determined by A. S. T. M. tentative standard D611-41T.

Such oils also are preferred which contain at least 90%, such as not less than 95%, and more particularly not less than 97% of aromatic hydrocarbons.

Such oils also are preferred which have densities of not less than 0.95 and, more particularly, not less than 0.98, for example, between 0.99 and 1.02, and higher, such as 1.11 or 1.12.

Furthermore, such oils are preferred which have refractive intercepts as determined by the method described in The Science of Petroleum (1938), volume 2, beginning on page 1175, of not less than 1.08, for example, between 1.09 and 1.11, and higher, such as 1.125 or 1.135.

Moreover, such oils are preferred which have crystallizing points below 20° C. and more particularly below 10° C., such as below 0° C., —10° C., —20° C., —30° C., —40° C., or even lower. Should an oil have a crystallizing point above a desired temperature, its crystallizing point may be reduced by cooling to a desired temperature level, and separating the solidified material as described and claimed in my copending application Serial No. 523,116, filed February 19, 1944, now Patent No. 2,415,541.

These values represent preferred limits for aromatic oils of the type described herein when used for sulfurized oil compositions.

As pointed out previously, high-boiling aromatic oils which are of particular value for use in sulfurized oil compositions may be isolated from the tar or tar emulsion obtained as a result of the pyrolytic decomposition of petroleum, or a fraction thereof, by the flash distillation or more preferably the solvent extraction of the tar or tar emulsion. The extract obtained may be separated into a high boiling and a low boiling fraction, or other fractions, if desired, after which the high boiling fraction, or the overall extract, may be subjected to polymerization to remove the unsaturated materials present. The oil obtained from such operations then may be refined, such as by sulfuric acid washing and/or other refining operations, after which the oil may be used as such, or it may be further distilled and/or fractionated, or it may be processed otherwise.

The oil obtained from the polymerizing operation also may be treated with clay or other surface active agent, either before or after separation from the polymers, followed by filtration and/or distillation, if desired. Successive clay treatments may be employed.

The preparation of a refined oil of the type more particularly described herein may be illustrated by the following example.

*Example 4*

A sample of the high-boiling aromatic oils obtained as in Example 2 and having the following distilling characteristics:

| | ° C. |
|---|---|
| First drop | 235 |
| 5% | 241 |
| 10% | 243 |
| 50% | 251 |
| 70% | 258 |
| 90% | 273 |
| 95% | 285 | was treated with three successive portions of 3% by volume of 95.5% sulfuric acid at room temperatures. After removing the sludge formed, the oil was diluted by the addition of toluene. The diluted oil then was washed with several successive portions of water, then with a 20% aqueous solution of sodium carbonate, and finally with water until the washings were neutral. The toluene then was removed by distillation at atmospheric pressure, after which the high-boiling aromatic oil was distilled under reduced pressure.

A water-white, stable oil possessing excellent properties thus was obtained.

Aromatic oils of the type described herein, and particularly acid-refined oils of this type, are well adapted for use in sulfurized oil compositions due to their excellent thermal and mechanical stability, their resistance to deterioration under severe service conditions, their low viscosity characteristics, which is of particular importance from the standpoint of synthetic rubber blends, and to their freedom from free carbon and other extraneous materials.

Hydrocarbon oils used heretofore for this purpose have been obtained mainly from two chief sources, namely (1) from coal tar and (2) from petroleum or moderately cracked petroleum products.

Aromatic oils of the type described herein differ fundamentally from such oils in that (1) they are substantially free from the sulfur, oxygen, and/or nitrogen impurities commonly present in oils derived from coal tar and (2) they are derived from petroleum or petroleum fractions by pyrolysis at temperatures greatly in excess of those employed heretofore. This deep cracking, in conjunction with the unique methods developed for the isolation of the said oils, results in the production of aromatic oils remarkably free from impurities.

The proportion of such oils which may be incorporated in sulfurized oils may be varied over a very wide range depending, among other things, upon the properties of the sulfurized oil, and the properties desired in the resulting composition. In general, however, I prefer to employ compositions containing at least 10% of either component. Thus, compositions containing 10% sulfurized oil and 90% aromatic oils of the type described herein, as well as those containing 10% aromatic oils of the type described herein and 90% sulfurized oil, possess properties which render them particularly desirable for use in a number of commercial applications, such as in coating compositions, linoleum, and mastic, and in rubber, and particularly synthetic rubber, compositions.

Particularly desirable results are obtained in many cases by the use of sulfurized oil formulations containing from 10% to 50% aromatic oils of the type described herein.

The aromatic oils may be incorporated in the sulfurized oil in any desired manner, such as by working on suitable rolls, or mixing in a suitable mill, such as a Banbury mill, or otherwise. The aromatic oils also may be incorporated in the oil, or mixture of oils, prior to reaction with sulfur or a sulfur-containing compound, if desired.

As previously pointed out, sulfurized oils modified by the incorporation therein of aromatic oils recovered from the tar formed during the production of gas by processes involving the pyrolytic decomposition or conversion of hydrocarbon oil, with or without the aid of catalysts, are unusually well adapted for blending with rubber, and particularly with synthetic rubbers or elastomers, to give compositions possessing exceptionally good properties. As blending agents for synthetic rubbers or elastomers, they enhance, rather than detract from, the physical properties of such materials in many cases.

Probably the outstanding improvement effected by the incorporation of my sulfurized oil-aromatic oil compositions in synthetic rubber formulations is the improvement in their tack and adhesive properties. These effects are particularly pronounced when factice modified with at least 20%, and more particularly 30%, of an oil of the type described herein is employed.

Examples of the rubber or rubber-like materials with which these sulfurized oil-aromatic oil blends may be compounded are the various grades and types of natural rubber and rubber-like materials, and synthetic rubbers or elastomers, such as, for example, those obtained by the polymerization of one or more diolefines, or substituents thereof, such as butadiene, isoprene, piperylene, 2-chlorobutadiene, and the like, either alone, or in admixture, or in combination with one or more unsaturated and/or reactive compounds or materials such as olefines, unsaturated nitriles, acids, esters, ethers, ketones, aldehydes, and/or substituents thereof, such as, for example, styrene, acrylic nitrile, isobutylene, acrylic esters, and the like. Important examples of synthetic rubbers or elastomers are those obtained by the copolymerization of one or more diolefines with (1) acrylic nitrile, (2) styrene or substituents thereof, and/or (3) isobutylene or similar olefines. These materials are known in the art under different trade names, such as, for example, Buna, Buna S, Buna N, Perbunan, chloroprene, neoprene, Ameripol, Hycar, butyl rubber, and the like.

Synthetic rubbers of the type obtained by the reaction of dihalides with organic or inorganic sulfides or polysulfides also are included, such as, for example, the material prepared by the reaction of ethylene dichloride with sodium tetrasulfide and sold under the trade name, Thiokol, as well as elastics of the type illustrated by polyvinylchloride.

The quantity of sulfurized oil-aromatic oil composition of the type described herein which may be incorporated in natural or synthetic rubbers, or elastomers, may be varied over very wide limits, depending upon the properties desired. Thus, for example, quantities varying from a few percent, or less, to an amount equal to, or greater than, the quantity of rubber, or rubber mixture, employed in the composition, may be used.

In general, however, I prefer to incorporate from 5% to 50%, and more particularly from 5% to 30%, by weight of such sulfurized oil-aromatic oil blend in natural and/or synthetic rubber compositions, based on the weight of the rubber present in the said composition.

In addition to sulfurized oil-aromatic oil blends of the type described herein, other ingredients which may be incorporated in natural rubber and/or synthetic rubber compositions include vulcanizing agents and/or accelerators, such as, for examples, sulfur or sulfur-containing compounds such as tetramethylthiuram disulfide, mercaptoarylenethiazoles, and dithio carbamates, metallic oxides, such as, for examples, magnesium oxide, zinc oxide, and lead oxide antioxidants, such as, for examples, phenyl-alpha-naphthylamine (Neozone A), and phenyl-beta-naphthylamine (Neozone D), reinforcing pigments, such as, for examples, carbon blacks, clay, and blanc fixe, fillers and/or diluents, such as, for example, lithophone, barytes, asbestine, and glue, softeners, such as, for example, paraffin wax, oils, fatty acids, and other synthetic or natural resins and/or deodorants, such as terpene compounds.

Reclaimed rubber is also included among the materials which may be blended with the sulfurized oil-aromatic oil blends herein described, together with natural and/or synthetic rubber and with or without other ingredients.

The sulfurized oil-aromatic oil blend, and other ingredients, may be mixed or compounded with the natural rubber and/or synthetic rubber on mixing rolls, or they may be compounded by any other method known in the art. The rubber composition then may be vulcanized, if desired, by any of the methods employed for this purpose in the art.

The invention may be more particularly described by means of the following examples.

*Example 5*

A mixture of 20 parts of aromatic oil of the type described is thoroughly blended with 80 parts of brown factice on a roll mill. The tack and adhesion of the factice is greatly improved.

*Example 6*

A mixture of 50 parts of an aromatic oil of the type described and 50 parts of a liquid sulfurized oil is blended with equal parts of bodied linseed oil. Upon diluting with an equal volume of mineral spirits, and adding small quantities of a drier, a very satisfactory coating composition is obtained.

*Example 7*

A mixture of 50 parts of an aromatic oil of the type described, 50 parts of a sulfurized bodied linseed oil, and 50 parts of hardened linseed oil is thoroughly blended with an equal quantity of ground cork and applied to a burlap surface. A satisfactory floor covering is obtained.

*Example 8*

| Component | Parts by weight |
|---|---|
| Butadiene-acrylic nitrile copolymer rubber | 100.0 |
| Sulfurized oil-aromatic oil blend | 40.0 |
| Zinc oxide | 5.0 |
| Benzothiazyl disulfide | 1.5 |
| Sulfur | 1.5 |
| Phenyl beta naphthylamine | 1.0 |
| Channel black | 50.0 |
| Stearic acid | 0.5 |

*Example 9*

| Component | Parts by weight |
|---|---|
| Natural rubber | 100.0 |
| Sulfurized oil-aromatic oil blend | 20.0 |
| Zinc oxide | 5.0 |
| Sulfur | 2.5 |
| Mercaptobenzothiazole | 0.8 |
| Channel black | 10.0 |

*Example 10*

| Component | Parts by weight |
|---|---|
| Butadiene-styrene rubber | 100.0 |
| Sulfurized oil-aromatic oil | 5.0 |
| Carbon black | 35.0 |
| Sulfur | 3.0 |
| Mercaptobenzothiazole | 0.8 |
| Zinc oxide | 10.0 |
| Phenyl α-naphthylamine | 2.0 |

*Example 11*

| Component | Parts by weight |
|---|---|
| Neoprene | 100.0 |
| Sulfurized oil-aromatic oil blend | 5.0 |
| Magnesia | 10.0 |
| Carbon black | 35.0 |
| Pine tar | 3.0 |
| Phenyl α-naphthylamine | 2.0 |
| Sulfur | 1.0 |
| Zinc oxide | 5.0 |

*Example 12*

| Component | Parts by weight |
|---|---|
| Isobutylene-butadiene rubber | 100.0 |
| Sulfurized oil-aromatic oil blend | 10.0 |
| Carbon black | 15.0 |
| Sulfur | 1.0 |
| Mercaptobenzothiazole | 0.5 |
| Phenyl α-naphthylamine | 1.0 |
| Zinc oxide | 5.0 |

The foregoing compositions may be sheeted out, shaped and vulcanized, such as by the application of a temperature of say 140° C. in a press for a period of say 45 minutes. Other procedures may, of course, be used if desired.

To summarize, the present invention may be said to reside more completely in the provision of improved sulfurized oil-aromatic oil compositions, the said aromatic oil being obtained from petroleum oil gas tar and boiling substantially completely above 210° C., and in the utilization of such compositions in the preparation of coating compositions, linoleum and mastic, and in natural and/or synthetic rubber compositions.

In the specification and in the claims, the term "sulfurized oils" is intended to mean oils modified by the incorporation of sulfur therein, either alone or in combination with other ingredients, such as halides.

The terms "aromatic oil boiling above 210° C.," "aromatic oil boiling above 250° C.," and "aromatic oil boiling above 275° C." unless otherwise modified, is intended to include the unrefined or refined oil, the preponderating portion of which boils above the indicated temperatures, separated from tar formed during the production of combustible gas by processes involving the pyrolytic decomposition of petroleum oil with or without the aid of catalysts, as well as mixtures of such aromatic oil with the unsaturated aromatic hydrocarbons derived from the same source and/or the resinous polymers derived therefrom.

The term "refined aromatic oil" refers to an oil of the type described which has been acid-washed, followed by the removal of any acid residues and/or sludge present.

Rubber has been defined in the prior art as follows:

A. "An organic material which shows a high elasticity of 100 percent or more at room temperature and which does not lose this property upon storage at room temperature for considerable periods."

B. "A rubber is a substance which shows an elasticity of 800% or more with a quick return (snap) at temperatures at which natural rubber shows the same effect and which does not lose this property upon storage any sooner than does natural rubber."

C. "In order to qualify as a rubber, a material should stretch readily to a considerable degree and after release retract forcefully and quickly."

For the purposes of the claims, I prefer the following definition.

"The term rubber is intended to embrace elastomers, whether natural or synthetic, and whether or not admixed with other ingredients such as pigments, softening agents, etc., in the vulcanized or unvulcanized state, the said elastomer being (1) capable of vulcanization such as by the application of heat when in admixture with sulfur or other vulcanizing agent, or otherwise, (2) slightly soluble or substantially insoluble in bodied drying oils such as bodied linseed oil, and (3) capable, either in the unvulcanized state or at some stage in the vulcanization thereof, of being stretched readily to a considerable degree and, after release of the applied stress, retracting forcefully and quickly."

While various procedures and formulas have been particularly described these are of course subject to considerable variation. Therefore, it will be understood that the foregoing specific examples are given by way of illustration, and that changes, omissions, additions, substitution and/or modifications might be made within the scope of the claims without departing from the spirit of the invention, which is intended to be limited only as required by the prior art.

I claim:

1. A composition of matter comprising 10% to 90% of a sulfurized fatty oil and 90% to 10% of a hydrocarbon oil which has been physically separated from tar produced in the vapor phase pyrolysis at average temperatures above 1300° F. of petroleum oil and which hydrocarbon oil boils above 210° C. but is free from and of greater volatility than the pitch of said tar, said hydrocarbon oil having an aromatic hydrocarbon content of at least 90%, and also being substantially free from resin-forming material.

2. A composition of matter comprising 10% to 90% of a sulfurized fatty oil and 90 to 10% of a hydrocarbon oil which has been physically separated from tar produced in the vapor phase pyrolysis at average temperatures above 1300° F. of petroleum oil and which hydrocarbon oil boils above 300° C. but is free from and of greater volatility than the pitch of said tar, said hydrocarbon oil having an aromatic hydrocarbon content of at least 95%, and also being substantially free from resin-forming material polymerizable by the application of heat alone.

3. A composition of matter comprising 10% to 90% of a sulfurized fatty oil and 90 to 10% of a hydrocarbon oil which has been physically separated from tar produced in the vapor phase pyrolysis at average temperatures above 1300° F. of petroleum oil and which hydrocarbon oil boils above 275° C. but is free from and of greater volatility than the pitch of said tar, said hydrocarbon oil having an aromatic hydrocarbon content of at least 95%, and also being substantially free from resin-forming material polymerizable by means of sulfuric acid.

4. A composition of matter comprising 10% to 90% of sulfurized linseed oil and 90% to 10% of a hydrocarbon oil which has been physically separated from tar produced in the vapor phase pyrolysis at average temperatures above 1300° F. of petroleum oil and which hydrocarbon oil boils above 210° C. but is free from and of greater volatility than the pitch of said tar, said hydrocarbon oil having an aromatic hydrocarbon content of at least 90%, and also being substantially free from resin-forming material.

5. A composition of matter comprising 10% to 90% of sulfurized soya bean oil and 90% to 10% of a hydrocarbon oil which has been physically separated from tar produced in the vapor phase pyrolysis at average temperatures above 1300° F. of petroleum oil and which hydrocarbon oil boils above 210° C. but is free from and of greater volatility than the pitch of said tar, said hydrocarbon oil having an aromatic hydrocarbon content of at least 90%, and also being substantially free from resin-forming material.

6. A composition of matter comprising 10% to 90% of sulfurized cottonseed oil and 90% to 10% of a hydrocarbon oil which has been physically separated from tar produced in the vapor phase pyrolysis at average temperatures above 1300° F. of petroleum oil and which hydrocarbon oil boils above 210° C. but is free from and of greater volatility than the pitch of said tar, said hydrocarbon oil having an aromatic hydrocarbon content of at least 90%, and also being substantially free from resin-forming material.

7. Floor mastic comprising a bodied drying oil admixed with a mixture containing from 10% to 90% of a sulfurized fatty oil and from 90% to 10% of a hydrocarbon oil which has been physically separated from tar produced in the vapor phase pyrolysis at average temperatures above 1300° F. of petroleum oil and which hydrocarbon oil boils above 210° C. but is free from and of greater volatility than the pitch of said tar, said hydrocarbon oil having an aromatic hydrocarbon content of at least 90%, and also being substantially free from resin-forming material.

8. A composition of matter comprising 10% to 90% of a sulfurized fatty oil and 90% to 10% of a hydrocarbon oil which has been physically separated from tar produced in the vapor phase pyrolysis at average temperatures above 1300° F. of petroleum oil and which hydrocarbon oil boils above 250° C. but is free from and of greater volatility than the pitch of said tar, said hydrocarbon oil having an aromatic hydrocarbon content of at least 95%, being substantially free from solid bodies at 10° C. and also being substantially free from unsaturation.

FRANK J. SODAY.

REFERENCES CITED

The following references are of record in the file of this patent:

UNITED STATES PATENTS

| Number | Name | Date |
| --- | --- | --- |
| 46,610 | Simpson | Feb. 28, 1865 |
| 1,376,173 | Snelling | Apr. 26, 1921 |
| 1,793,161 | Cowdery | Feb. 17, 1931 |
| 2,180,367 | Rostler | Nov. 21, 1939 |
| 2,318,745 | Bulifant | May 11, 1943 |

FOREIGN PATENTS

| Number | Country | Date |
| --- | --- | --- |
| 14,859 | Great Britain | 1908 |
| 618,592 | Germany | Sept. 11, 1935 |